US010882769B2

United States Patent
Rand et al.

(10) Patent No.: US 10,882,769 B2
(45) Date of Patent: Jan. 5, 2021

(54) METHOD AND INSTALLATION FOR OZONE TREATMENT OF WASTEWATER

(71) Applicant: Xylem IP Management S.à r.l., Senningerberg (LU)

(72) Inventors: Wiebke Rand, Bielefeld (DE); Hans-Joachim Anton, Bielefeld (DE); Manfred Hohloch, Herford (DE)

(73) Assignee: Xylem IP Management S.à r.l., Senningerberg (LU)

( * ) Notice: Subject to any disclaimer, the term of this patent is extended or adjusted under 35 U.S.C. 154(b) by 213 days.

(21) Appl. No.: 15/773,641

(22) PCT Filed: Nov. 6, 2015

(86) PCT No.: PCT/EP2015/075966
§ 371 (c)(1),
(2) Date: May 4, 2018

(87) PCT Pub. No.: WO2017/076474
PCT Pub. Date: May 11, 2017

(65) Prior Publication Data
US 2018/0312417 A1 Nov. 1, 2018

(51) Int. Cl.
*B01F 3/04* (2006.01)
*B01F 3/08* (2006.01)
(Continued)

(52) U.S. Cl.
CPC .............. *C02F 1/78* (2013.01); *B01F 3/0451* (2013.01); *B01F 3/0876* (2013.01);
(Continued)

(58) Field of Classification Search
CPC .... B01F 3/0451; B01F 3/0876; B01F 5/0415; B01F 5/0421; B01F 5/0428; B01F 5/0456;
(Continued)

(56) References Cited

U.S. PATENT DOCUMENTS

| 5,273,664 A * | 12/1993 | Schulz ............... C02F 1/78 210/192 |
| 2010/0018932 A1* | 1/2010 | Liechti ............... C02F 1/78 210/760 |
| 2011/0186495 A1 | 8/2011 | Robinson et al. |

FOREIGN PATENT DOCUMENTS

| CA | 2 662 763 C | 11/2012 |
| FR | 2 762 232 A1 | 10/1998 |
| WO | 2013/088031 A1 | 6/2013 |

OTHER PUBLICATIONS

International Preliminary Report on Patentability and Written Opinion for International Application No. PCT/EP2015/075966, dated May 8, 2018, 8 pages.

(Continued)

*Primary Examiner* — Lucas A Stelling
(74) *Attorney, Agent, or Firm* — RatnerPrestia

(57) ABSTRACT

A method and an installation for treating a main wastewater stream flowing in a closed conduit with a flow direction. The method includes the steps of: introducing a liquid into at least one pre-treatment stream; generating a gas stream containing ozone gas; introducing the gas stream into the at least one pre-treatment stream, each with a gas injector, resulting in at least one mixed-phase stream comprising ozone laden gas and liquid; passing the at least one mixed-phase stream through at least one static mixer, resulting in a predefined gas bubble size; and injecting the at least one mixed-phase stream in the main wastewater stream perpendicular to the flow direction.

20 Claims, 3 Drawing Sheets

(51) Int. Cl.
*B01F 5/04* (2006.01)
*B01F 5/06* (2006.01)
*C02F 1/78* (2006.01)

(52) U.S. Cl.
CPC .......... *B01F 5/0415* (2013.01); *B01F 5/0421* (2013.01); *B01F 5/0428* (2013.01); *B01F 5/0456* (2013.01); *B01F 5/0463* (2013.01); *B01F 5/0498* (2013.01); *B01F 5/061* (2013.01); *B01F 2003/04886* (2013.01); *B01F 2215/0052* (2013.01); *C02F 2201/782* (2013.01); *C02F 2201/784* (2013.01); *C02F 2303/26* (2013.01); *C02F 2305/023* (2013.01)

(58) Field of Classification Search
CPC ...... B01F 5/0463; B01F 5/0498; B01F 5/061; B01F 2003/04886; B01F 2215/0052; C02F 1/78; C02F 2201/782; C02F 2201/784; C02F 2303/26; C02F 2305/023
See application file for complete search history.

(56) References Cited

OTHER PUBLICATIONS

International Search Report of PCT Patent Application No. PCT/EP2015/075966 dated Dec. 10, 2015.

\* cited by examiner

METHOD AND INSTALLATION FOR OZONE TREATMENT OF WASTEWATER

CROSS-REFERENCE TO RELATED APPLICATIONS

This patent application is a U.S. National Phase Patent Application of PCT Application No.: PCT/EP2015/075966, filed Nov. 6, 2015, which is incorporated by reference herein in its entirety.

FIELD OF THE INVENTION

The present invention relates to a method and installation for treating a wastewater stream with ozone.

BACKGROUND OF THE INVENTION

Ozone is a strong oxidant. This is why gaseous ozone is effective for disinfection in water treatment. Various types of installations and methods have been devised to introduce and dissolve gaseous ozone into water, whereas the primary purpose of each of those approaches is to transfer sufficient gaseous ozone to the body of water to be treated. Due to the cost of generating ozone it is additionally intended to dissolve as much of the available ozone in the water to minimize the loss of gaseous ozone by degassing. It is also desirable to obtain an even distribution of the ozone concentration in the water in order to achieve the necessary minimum concentration for the desired disinfection efficiency in each volume element of the water stream, without having to introduce too much ozone in excess. The ozone-containing gas bubbles need to be brought into contact with the water over a sufficient length of time to allow transfer of the ozone from the gaseous to the liquid phase, where the ozone will be finally brought to reaction. The ozone transfer efficiency is the ratio of the amount of ozone fed into the system and the amount of ozone transferred into the liquid phase for the reaction to occur. Transfer efficiencies of greater than 80 percent typically are required for efficient ozone disinfection.

Common ozone dissolution methods include bubble diffuser contactors, injectors and turbine mixers.

Canadian patent CA 2 662 763 C discloses an injector for bringing ozone into contact with a vertical stream of liquid, such as wastewater. A tapped-off fraction of the stream is mixed with a gas laden with ozone creating a two-phase tapped-off stream. The two-phase tapped-off stream is introduced into the vertical stream as a side stream via a vertical injection tube, producing a jet with a downwardly vertical velocity component that is sufficient for the gas bubbles to be entrained downwards, without them rising against the descending vertical flow of wastewater.

Accordingly, the main focus of the ozone injection system described in CA 2, 662,763 is to prevent gas bubbles from rising to the surface, on the assumption that by "trapping" more bubbles into the body of wastewater, the ozone transfer efficiency will necessarily increase. To trap the bubbles in the body of wastewater, the downward injection velocity of the bubbles must be sufficient to overcome the natural tendency of the bubbles to rise to the surface.

However, the requirement to use a high downward injection velocity has a significant downside; it creates a non-homogenous bubbles/wastewater mixture, which disrupts the efficient transfer of ozone from the gaseous phase to the liquid phase. To elaborate, the downward high-speed injection has the effect of displacing the wastewater at the injection site which produces high turbulence with undesired eddies. The flow is no longer plug-like, as it now contains turbulent currents, which move in different directions.

The non-homogenous flow regime results in very different contact times between the different currents and the gas bubbles containing ozone. Thus, ozone dissolution and ozone concentration will vary from one current to another, which leads to a decreased system efficiency.

SUMMARY OF THE INVENTION

The object of the present invention is to provide an efficient method and installation for treating a wastewater stream with ozone, which produces a more homogenous wastewater and gas distribution by comparison to prior art techniques.

As embodied and broadly described herein the invention provides a method for treating a main wastewater stream flowing in a closed conduit with a flow direction, the method comprising:

Introducing a liquid into at least one pre-treatment stream; generating a gas stream containing ozone gas;

Introducing the gas stream into the at least one pre-treatment stream, preferably each with a Venturi injector, resulting in at least one mixed-phase stream comprising ozone laden gas and liquid;

Passing the at least one mixed-phase stream through at least one static mixer, resulting in a predefined gas bubble size; and Injecting the at least one mixed-phase stream in the main wastewater stream generally perpendicular to the flow direction.

The mixed-phase stream injection generally perpendicular to the flow direction of wastewater has the advantage, that it does not disturb the overall plug flow and spans the diameter or width of the stream of wastewater to form a so-called "hydraulic shield" generally perpendicular to flow direction, i.e. it forms a region where practically no back flow of ozone-free volume elements through the cross section of the main stream at the injection point occurs. Accordingly, the homogeneity of the gas distribution in the wastewater across the conduit is improved.

In such a method the injection into the main wastewater stream can take place in a vertical downward flowing part of the stream without disadvantages.

The injection can also take place in a horizontal or essentially horizontal main stream of wastewater, because the tendency of de-mixing due to rising of the non-dissolved gas bubbles is significantly reduced as a result of the small bubble size. There is no significant loss of ozone laden gas due to bubbles rising to the top of the conduit.

In order to produce a substantially homogeneous concentration of ozone laden gas bubbles across the cross section of the stream, each of the at least one mixed-phase streams is supplied through an injection tube, which is arranged parallel to the direction of wastewater flow. The injection tubes can have at their lower end in relation to the direction of the wastewater flow at least one injection outlet which lies in a plane generally perpendicular to the wastewater flow direction, so that the mixed-phase stream can be injected generally perpendicular to the wastewater flow direction.

Preferably, the pre-treatment stream is a tapped-off fraction of the main wastewater stream. The pre-treatment stream is withdrawn as a side stream from the main wastewater stream by a pump.

Advantageously, the at least one injection outlet can be orientated radially inwardly and/or radially outwardly depending on the arrangement of the corresponding injection tube in the conduit.

As embodied and broadly described herein the invention also provides an installation for introducing ozone into wastewater for treatment for disinfection or oxidation purposes, said installation comprising:

A closed conduit for a wastewater stream to be treated, whereas the wastewater stream has a flow direction;

An ozone generator fed with a carrier gas outputting ozone-rich carrier gas;

At least one pre-treatment stream, which is mixed with the ozone-rich carrier gas by an injector, preferably a Venturi injector, resulting in mixed-phase stream;

At least one injection tube through which the mixed-phase stream flows, wherein the at least one injection tube contains at least one static mixer and the at least one injection tube has it its lower end in flow direction at least one injection outlet, which is configured to introduce the mixed-phase stream as a jet oriented generally perpendicular to the flow direction into the wastewater stream.

This installation allows injecting the mixed-phase stream generally perpendicular to the flow direction of wastewater, which has the advantage, that it does not disturb the plug flow, produces a hydraulic shield perpendicular to the flow direction to improve the homogeneity of the mixed phase stream containing water and gas across the wastewater conduit.

In such an installation the at last one injection tube can be arranged at least partially within the wastewater conduit and parallel to the flow direction of the wastewater stream.

Preferably, the at least one static mixer produces bubbles having a diameter below 1 mm. These bubbles have an advantageous ratio between bubble surface and bubble volume.

The pre-treatment stream can be a tapped-off fraction of the wastewater stream.

Further, the injection tube can be arranged in the wastewater flowing vertically downward. However, according to the present invention, the wastewater main stream can also be treated by injection of the ozone laden side stream in a horizontal conduit. Advantageously, the at least one injection outlet can be oriented radially inwardly and/or radially outwardly depending on the arrangement of the corresponding injection tube in the conduit.

As embodied and broadly described herein the invention further provides a method for treating a wastewater stream with ozone and an installation for treating a wastewater stream with ozone characterized in that the wastewater stream at the site of injection of ozone laden gas bubbles is substantially a plug-flow in which the ozone laden gas bubbles are distributed.

As embodied and broadly described herein the invention further provides a method for treating a wastewater stream with ozone and an installation for treating a wastewater stream with ozone characterized in that the ozone laden gas bubbles are distributed substantially uniformly in the wastewater stream at the injection site.

As embodied and broadly described herein the invention further provides a method for treating a wastewater stream with ozone and an installation for treating a wastewater stream with ozone, characterized in that the ozone laden gas bubbles introduced in the wastewater stream have an average diameter less than 1 mm.

BRIEF DESCRIPTION OF THE DRAWING FIGURES

Other aspects and features of the present invention will become apparent to those ordinarily skilled in the art upon review of the following description of specific embodiments of the invention in conjunction with the accompanying Figures.

The following drawings show exemplary embodiments of the present invention, in which.

DETAILED DESCRIPTION OF THE FIGURES

Figure 1:
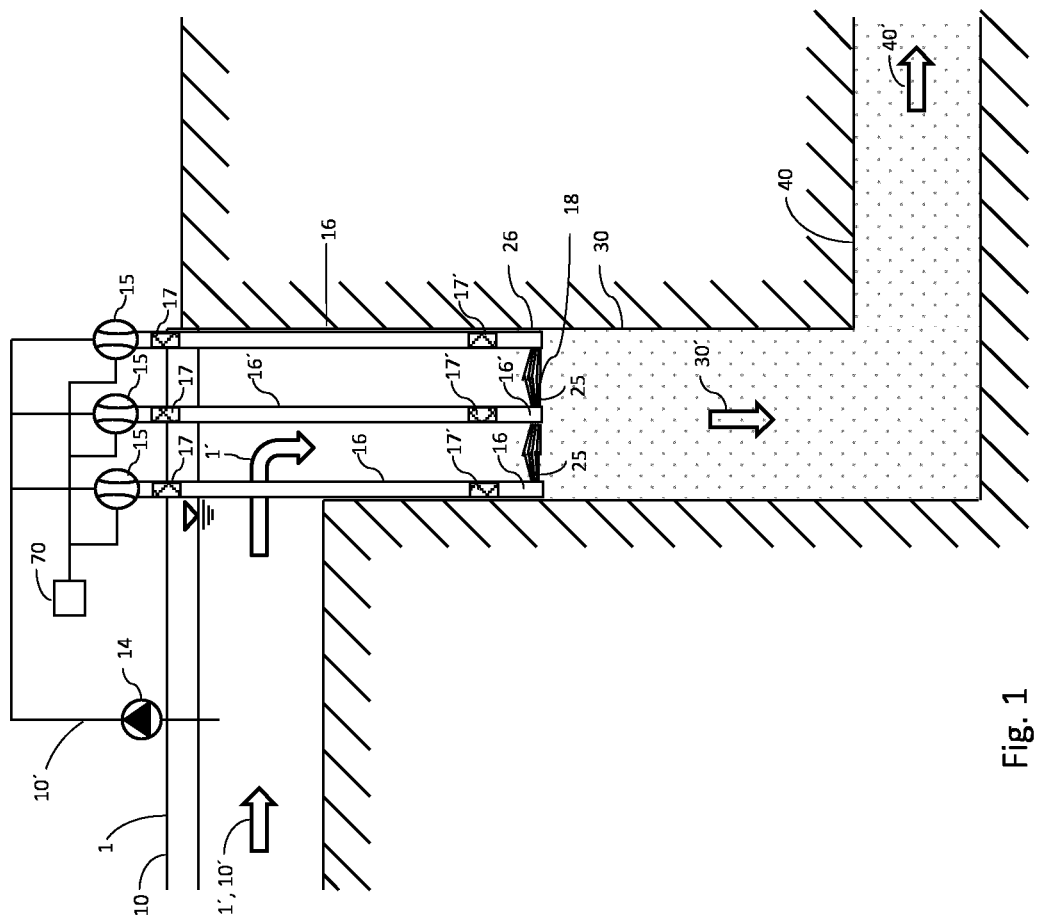
FIG. 1 is a schematic vertical cross section of an ozone dissolution installation according to a first embodiment of the present invention.

In the drawings, embodiments of the invention are illustrated by way of example. It is to be expressly understood that the description and drawings are only for the purpose of illustrating certain embodiments of the invention and are an aid for understanding. They are not intended to be a definition of the limits of the invention.

The same features are denoted in all figures by the same reference signs.

FIG. 1 shows a specific design of a first embodiment of the present invention. A wastewater stream 1' is supplied via a conduit 1. The conduit 1 includes a first slightly inclined horizontal part 10 which opens towards its end above a descending vertical part 30. In the vertical part 30, the wastewater stream 30' forms a continuous liquid column. The flow is plug-like, in other words it is non-turbulent across the cross-section of the vertical part 30 such that no intermixing occurs between two successive fluid volume elements moving along the flow path. The vertical part 30 merges, at its lower end, into a second slightly inclined horizontal part 40.

Outside the conduit 10 at least one ozone generator 70 is fed with a carrier gas such as dry air, oxygen or an air/oxygen mixture, outputting ozone-rich carrier gas. A partial stream of the wastewater 10' is withdrawn from the conduit 10 in the first horizontal part 1 by a pump 14 and further separated into three partial streams. The ratio of volume of tapped-off stream to wastewater stream is 2% to 30% depending on the flow rate of the wastewater. The velocity of the wastewater stream may vary between 0.3 and 1.8 m/s. Each of the partial streams is then mixed with the ozone-rich carrier gas by a Venturi injector 15. Downstream of each of the Venturi injectors 15 an injection tube 16 is arranged. The cylindrical injection tubes 16 are arranged in parallel, and they extend vertically in the vertical part 30 of the conduit 1. The streams in the injection tubes have a velocity of around 4 to 10 m/s. The injection tubes 16 each contain a first and a second static mixer 17, 17', whereas the first static mixer 17 is arranged downstream right after the Venturi injector 15 and the second static mixer 17' is arranged further downstream shortly before the injection outlets 18. The static mixers 17, 17' ensure a desired maximum bubble size of about 0.8 mm in diameter at the outlet 18. Each injection tube 16 has at its lower end 16' one or multiple injection outlets 18. The injection outlets 18 are configured in such a way that the tapped-off and ozone-enriched wastewater stream is introduced into the descending vertical wastewater stream as a horizontally oriented jet 25 at each outlet 18. The injection outlets 18 can be designed e.g. as nozzles or openings in the injection tube 16.

A consequence of the horizontally orientated jet 25 is that the tapped-off wastewater stream with the bubble gas mixture can be almost uniformly distributed across the descending vertical wastewater stream 30' and be entrained with the water flow through the conduit. This method of injection does not disturb the plug flow and creates a hydraulic shield perpendicular to the flow direction that spans the cross section of the conduit. As indicated earlier, the hydraulic shield is a region where practically no back flow of ozone-free wastewater volume elements through the cross section of the main stream at the injection point occur. After the injection, a small fraction of up to 5% of the bubbles may rise upward in the vertical stream 30'. Due to the small size of the bubbles and consequently the slow rising of the bubbles, most of the ozone that is contained in the bubbles dissolves in the wastewater stream anyway and is therefore not wasted.

Figure 2:
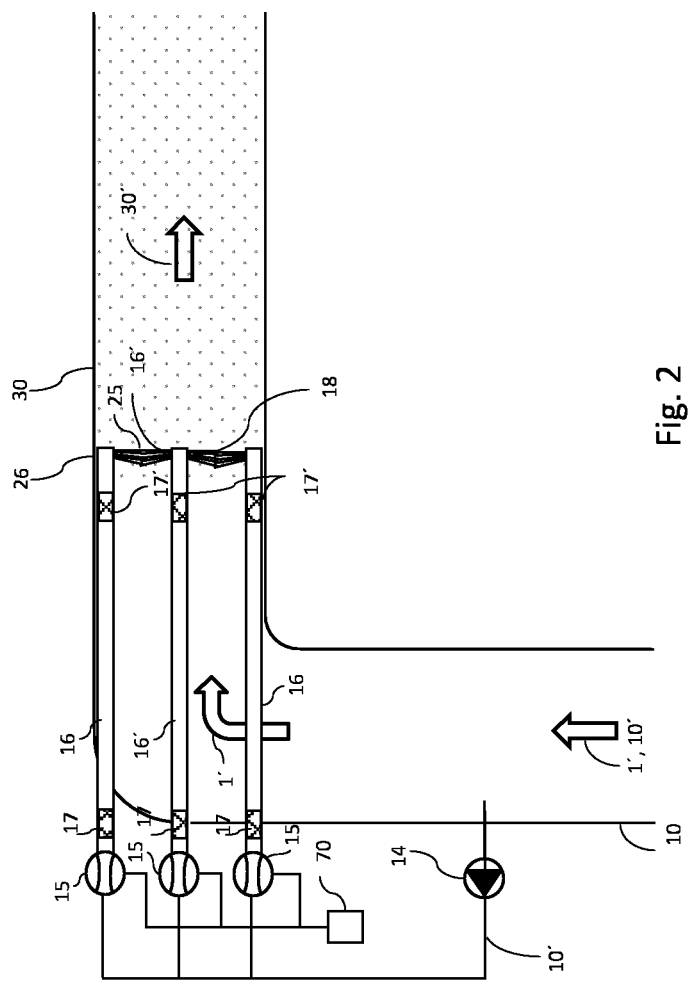
FIG. 2 is a schematic vertical cross section of an ozone dissolution installation according to a second embodiment of the present invention.

FIG. 2 shows a second embodiment of the present invention.

A wastewater stream 1 is supplied via a conduit 1. The conduit 1 includes a first vertical part 10 which merges towards its end into a horizontal part 30. In the horizontal part 30 the wastewater stream 30' forms a plug-like continuous liquid column, where no intermixing occurs between two successive fluid elements moving along the flow path.

Outside the conduit 10 at least one ozone generator 70 is fed with carrier gas such as dry air, oxygen or an air/oxygen mixture, outputting ozone-rich carrier gas. A partial stream of the wastewater 10' is withdrawn from the conduit 10 in the vertical part 1 by a pump 14 and further separated into three partial streams. The ratio of volume of tapped-off stream to the wastewater stream is 2 to 30% depending on the flow rate of the wastewater. Each of these partial streams is then mixed with the ozone-rich carrier gas by a Venturi injector 15. Downstream of each of the Venturi injectors 15 an injection tube 16 is arranged. The cylindrical injection tubes 16 are arranged parallel and they extend horizontally in the horizontal part 30 of the conduit 1. The streams in the injection tubes have a velocity of around 4 to 10 m/s. The injection tubes 16 each contain a first and a second static mixer 17, 17', whereas the first static mixer 17 is arranged right after the Venturi injector 15 and the second static mixer 17' is arranged shortly before the injection outlets 18. The static mixers 17, 17' produce a desired bubble size of about 0.8 mm in diameter at the outlet 18. Each injection tube 16 has at its lower end one or multiple injection outlets 18. The injection outlets 18 are configured in such a way that the tapped-off and ozone enriched wastewater stream is introduced into the horizontal wastewater stream as a vertically oriented jet 25, i.e. perpendicular to the direction of flow of the wastewater. The injection outlets 18 can be designed e.g. as nozzles or openings in the injection tube 16.

A consequence of the vertically orientated jet 25 is that the tapped-off wastewater stream with the bubble gas mixture can be almost uniformly distributed across the wastewater stream 30' and entrained with the wastewater flow through the conduit. This kind of injection has the advantage, that it does not disturb the plug flow and forms a hydraulic shield perpendicular to flow direction. After the injection, a small fraction of the bubbles may rise upward in the horizontal stream 30'. Due to the small size of the bubbles and consequently the slow rising of the bubbles, most of the ozone that is contained in the bubbles dissolves in the wastewater stream anyway and is therefore not wasted.

Alternatively, the representation of FIG. 2 could also be viewed as a plan view from above, in which both conduits 10 and 30 lie in the same horizontal plane. Again, in this horizontal arrangement both conduits 10 and 30 could be arranged in any angular relationship which may be useful under given restrictions in the topology of the installation.

Figure 3:
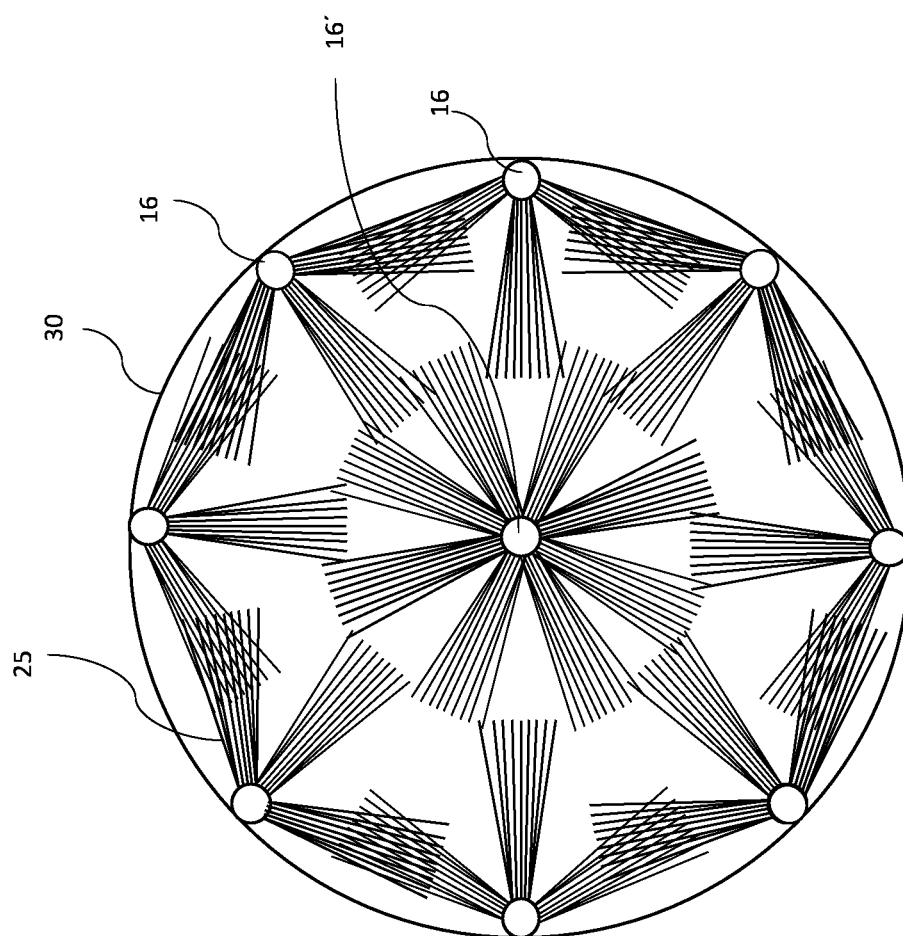
FIG. 3 is a schematic horizontal cross section of a conduit showing jets of ozone-enriched water in a to be treated water stream.

An exemplary injection scheme is shown in FIG. 3. In total nine injection tubes 16, 16' are arranged. Eight tubes 16 of these nine injections tubes are arranged close to the wall of the conduit uniformly spread in peripheral direction. One injection tube 16' is arranged centrally, showing eight uniformly distributed injection outlets 18. The injection outlets 18 of the other injection tubes 16 are configured in radial direction and round about plus/minus 60° to radial direction. All of the injection outlets 18 lie in one plane perpendicular to the flow of wastewater, so that the ozone enriched gas is uniformly distributed perpendicular to the flow of wastewater.

A number of injection tubes and injection outlets arrangements are conceivable for reaching the desired uniformity. The arrangement can depend on the actual water flow distribution, in case it differs from a rotationally symmetric plug flow.

The present invention is based on a gas injection generally perpendicular to the flow direction of wastewater. Preferably the gas injection lacks a velocity component in the direction of the flow direction of the wastewater. This kind of injection has the advantage, that it does not disturb the plug flow and forms a hydraulic shield perpendicular to flow direction. Due to the non-mixing of the stream, it can be efficiently treated evenly across the cross section with a desired constant contact time of the fluid elements with the gas bubbles. The small size of the bubbles is beneficial in many ways; firstly, small bubbles rise slowly in the water and secondly, due to the advantageous ratio between surface area and volume, the ozone transfer efficiency of small bubbles is much higher. Ozone that is contained in the rising bubbles is therefore very likely, with a high efficiency dissolved in the wastewater stream before reaching the stream surface and degassing.

The present invention provides a very efficient ozone dissolution method and installation for introducing homogeneous concentration of ozone into a wastewater stream to be treated.

Although both exemplary embodiments of FIGS. 1 and 2 show a layout in which the upstream conduit 10 is in a perpendicular relationship relative to the orientation section 30 of the conduit, which contains the mixing zone, it should be understood that this orientation is not a necessary feature. The orientation of the different sections 10, 30 and 40 of the conduit can be chosen freely so that any angular relationship is possible. Thus, the geometry can be adapted to e.g. the topology of the installation site.

The invention claimed is:

1. A method for treating a main wastewater stream flowing in a closed conduit with a flow direction, the method comprising the steps of:
    introducing a liquid into at least one pre-treatment stream;
    generating a gas stream containing ozone gas;
    introducing the gas stream into the at least one pre-treatment stream with a gas injector, resulting in at least one mixed-phase stream comprising ozone-laden gas and liquid;

passing the at least one mixed-phase stream through at least one static mixer and through an injection tube arranged parallel to the flow direction of the main wastewater stream and having at its downstream end at least one injection outlet lying in one plane perpendicular to the flow direction; and injecting the mixed-phase stream in a vertically downward flowing part of the main wastewater stream perpendicular to the flow direction through the at least one injection outlet.

2. The method of claim 1, wherein the pre-treatment stream is a tapped-off fraction of the main wastewater stream.

3. The method of claim 1, wherein the at least one injection outlet is oriented radially inwardly relative to a longitudinal axis of the conduit.

4. The method of claim 1, wherein the at least one injection outlet is oriented radially outwardly relative to ea longitudinal axis of the conduit.

5. The method of claim 1, wherein the closed conduit defines a peripheral wall, further comprising arranging a first injection tube at least partially within the closed conduit parallel to the flow direction with a downstream end having at least one injection outlet oriented to inject a first mixed-phase stream perpendicular to the flow direction and radially inward relative to the peripheral wall of the closed conduit, and at least a second injection tube arranged at least partially within the closed conduit parallel to the flow direction with a downstream end having at least one injection outlet oriented to inject a second mixed-phase stream perpendicular to the flow direction and radially outward relative to the peripheral wall of the closed conduit.

6. The method of claim 5, comprising arranging the at least one injection outlet of the first injection tube and the at least one injection outlet of the second injection tube in a single plane perpendicular to the flow of wastewater and injecting the first mixed-phase stream and the second mixed-phase stream along the single plane.

7. The method of claim 1, wherein the main wastewater stream is in plug flow upstream of the injected mixed-phase stream, and the injected mixed-phase stream forms a hydraulic shield perpendicular to the flow direction of the main wastewater stream and does not disturb plug flow.

8. An installation for introducing ozone into wastewater for treatment for disinfection or oxidation purpose, said installation comprising:

a closed conduit in which wastewater stream can be treated;

an ozone generator configured to output ozone-rich carrier gas;

an injector configured to mix at least one pre-treatment stream with the ozone-rich carrier gas resulting in mixed-phase stream;

at least one injection tube arranged parallel to a flow direction of the wastewater stream, through which the mixed-phase stream can flow;

at least one static mixer within the at least one injection tube; and at least one injection outlet lying in one plane perpendicular to the flow direction of the wastewater stream, positioned at a downstream end of the at least one injection tube, the at least one injection outlet configured to introduce the mixed-phase stream in a vertically downward flowing part of the wastewater stream as a jet oriented perpendicular to the flow direction of the wastewater stream.

9. The installation in accordance with claim 8, wherein the at least one injection tube is arranged at least partially within the closed conduit.

10. The installation in accordance with claim 8, wherein the pre-treatment stream is a tapped-off fraction of the wastewater stream.

11. The installation in accordance with claim 8, wherein the injection tube is arranged in the wastewater flowing vertically downward.

12. The installation in accordance with claim 8, wherein the at least one injection outlet is orientated radially inwardly relative to a longitudinal axis of the conduit.

13. The installation in accordance with claim 8, wherein the at least one injection outlet is orientated radially outwardly relative to a longitudinal axis of the conduit.

14. The installation in accordance with claim 8, wherein the injection outlet of at least one first injection tube is oriented radially inwardly relative to a longitudinal axis of the conduit, and the injection outlet of at least one second injection tube is oriented radially outwardly relative to the longitudinal axis of the conduit.

15. The installation in accordance with claim 14, wherein the injection outlet of the at least one first injection tube and the injection outlet of at least one second injection tube lie in a single plane perpendicular to the flow of wastewater.

16. The installation in accordance with claim 15, wherein the closed conduit defines a peripheral wall, the installation comprises a single first injection tube arranged centrally within the closed conduit and a plurality of second injection tubes uniformly spread adjacent to the peripheral wall of the conduit.

17. The installation in accordance with claim 16, wherein each of the plurality of second injection tubes have a first injection outlet oriented radially inward relative to the peripheral wall of the conduit, and at least one additional injection outlet oriented at an acute angle relative to the first injection outlet.

18. The installation in accordance with claim 17, wherein each of the plurality of second injection tubes have two additional injection outlets, each oriented at the same acute angle relative to the first injection outlet in a first direction, one oriented at the acute angle in a plus direction, and one oriented at the acute angle in a minus direction.

19. The installation in accordance with claim 18, wherein the acute angle is 60 degrees.

20. The installation in accordance with claim 8, wherein the wastewater stream in the closed conduit upstream and downstream of the at least one injection outlet is in plug flow and the injection forms a hydraulic shield perpendicular to the flow direction.

* * * * *